(No Model.)  4 Sheets—Sheet 1.
G. H. BABCOCK, S. WILCOX, N. W. PRATT, & E. H. BENNETT.
STEAM BOILER.
No. 262,555.  Patented Aug. 15, 1882.
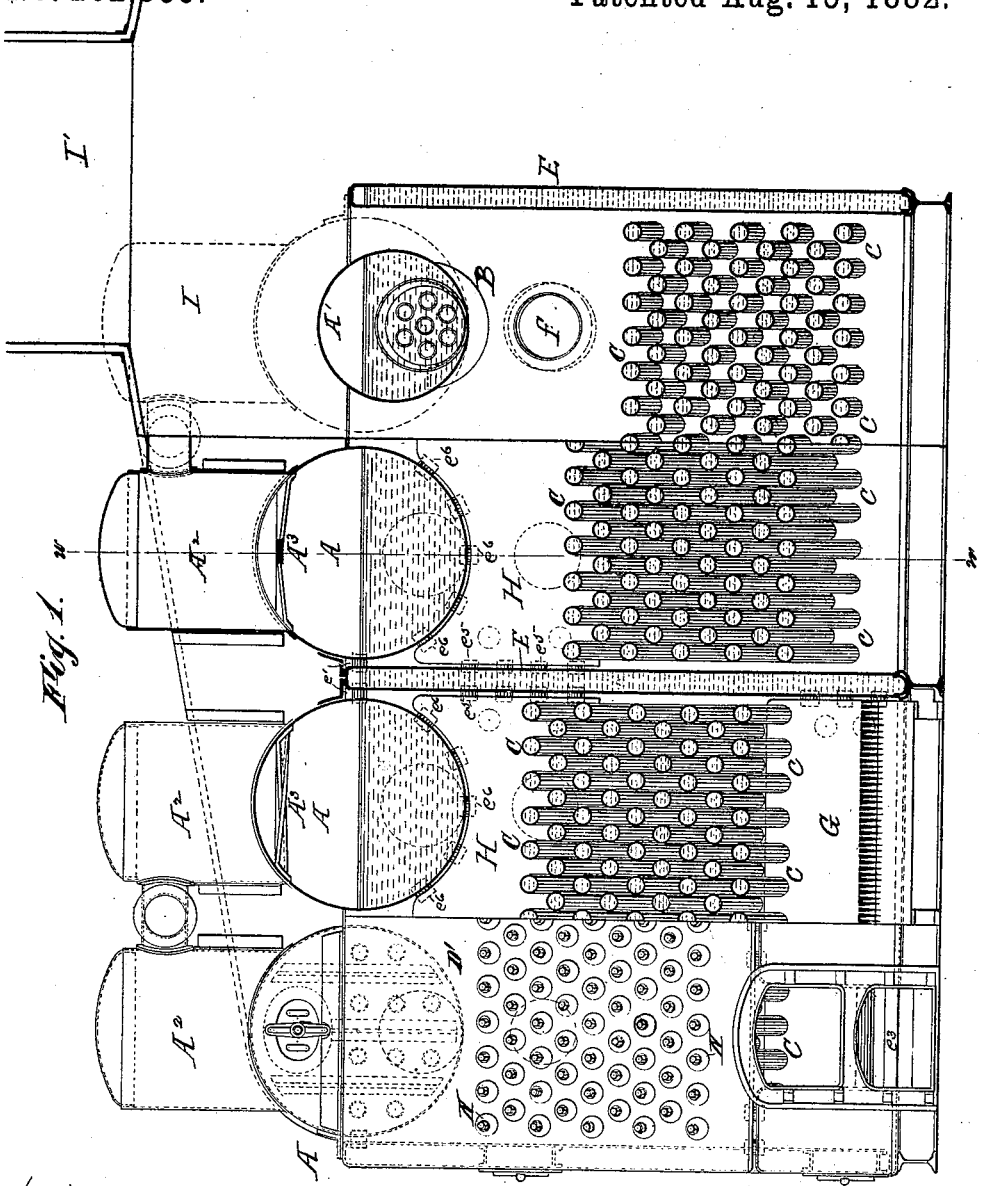
Witnesses
Charles R. Searle.
Charles C. Stetson
Inventors
Geo. H. Babcock,
Stephen Wilcox,
Nathaniel W. Pratt,
Edwin H. Bennett,
by their attorney J. S. Stetson.

(No Model.) 4 Sheets—Sheet 2.
G. H. BABCOCK, S. WILCOX, N. W. PRATT, & E. H. BENNETT.
STEAM BOILER.
No. 262,555. Patented Aug. 15, 1882.
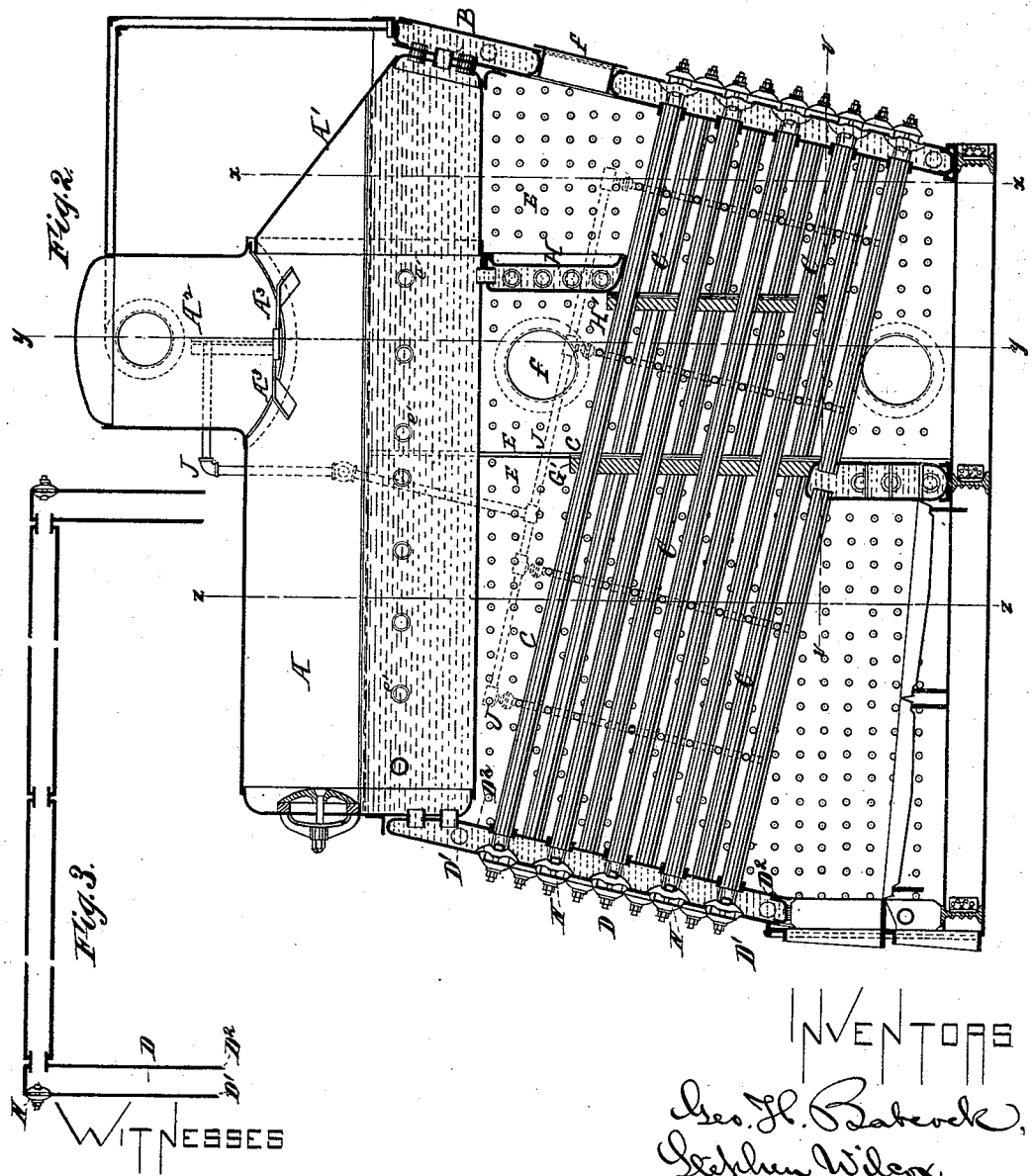

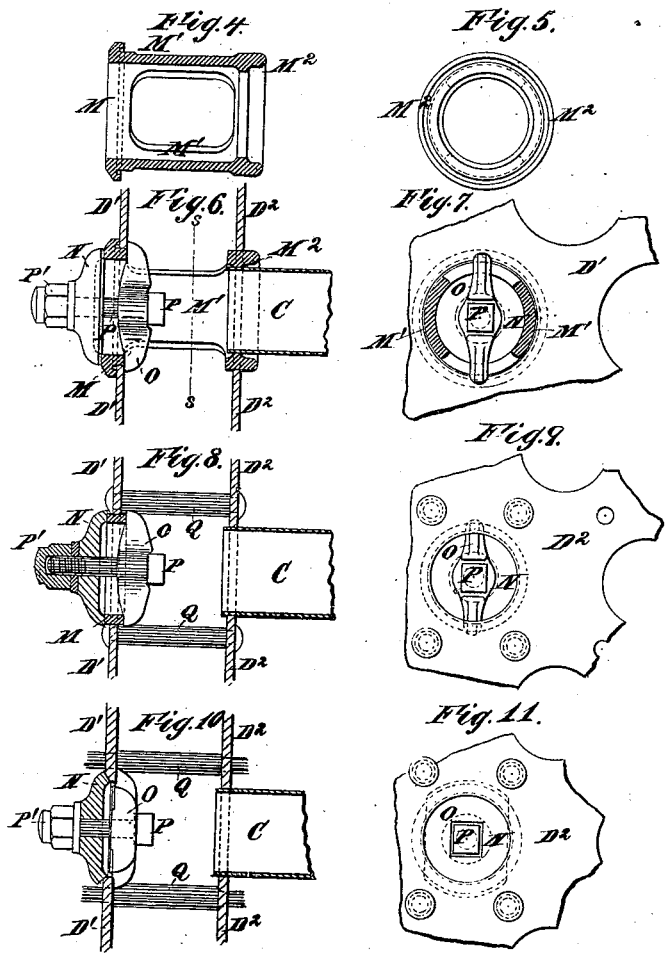

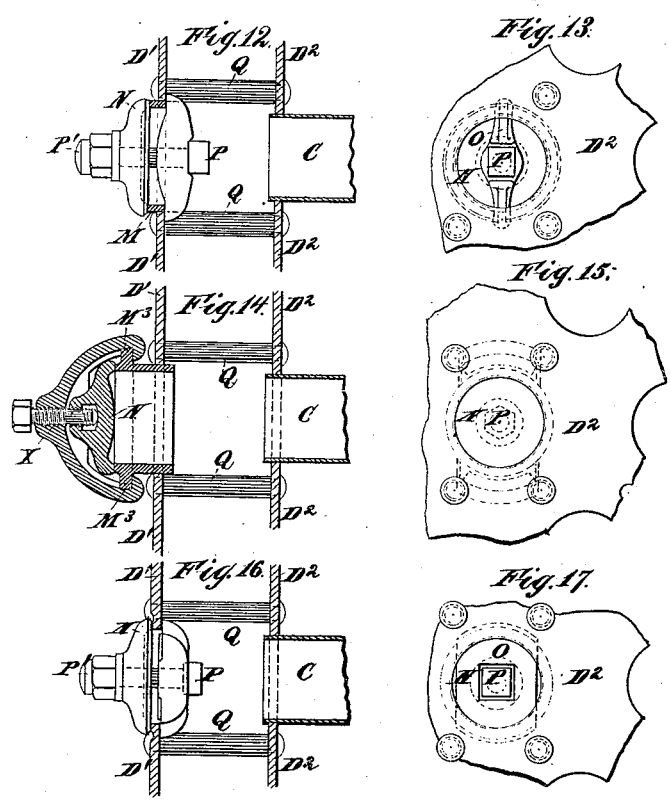

UNITED STATES PATENT OFFICE.

GEORGE H. BABCOCK, OF PLAINFIELD, NEW JERSEY, STEPHEN WILCOX AND NATHANIEL W. PRATT, OF BROOKLYN, NEW YORK, AND EDWIN H. BENNETT, OF BAYONNE, NEW JERSEY, ASSIGNORS TO THE BABCOCK & WILCOX COMPANY, OF NEW YORK, N. Y.

STEAM-BOILER.

SPECIFICATION forming part of Letters Patent No. 262,555, dated August 15, 1882.

Application filed September 8, 1881. Renewed June 23, 1882. (No model.)

*To all whom it may concern:*

Be it known that we, GEORGE H. BABCOCK, of Plainfield, Union county, in the State of New Jersey, STEPHEN WILCOX, of Brooklyn, Kings county, in the State of New York, NATHANIEL W. PRATT, of Brooklyn, aforesaid, and EDWIN H. BENNETT, of Bayonne, Hudson county, in the State of New Jersey, all citizens of the United States, have invented certain new and useful Improvements relating to Steam-Boilers, of which the following is a specification.

Our improvements pertain to that class in which a number of inclined tubes extend through the furnace, with an active circulation of water and steam through them, the water descending at the back connections and rising, mingled with steam, through front connections into a barrel or separating-chamber above. We form the front and back connections from continuous sheets of boiler iron or steel, and provide means for strongly staying them. We employ malleable castings, which are expanded in the holes, and, being faced off by a suitable tool on the outer surface, furnish accurate seats for correspondingly-finished covers. In the complete development of our invention we cause these castings to extend across the connection, and brace or stay the same, while providing liberally for the active circulation of the water and steam.

The following is a description of what we consider the best means of carrying out our invention, with several modifications.

The accompanying drawings form a part of this specification.

Figures 1, 2, and 3 show the general arrangement of a set of the boilers to which the invention is applied. Fig. 1 is a front elevation, partly in section. It shows half of a set of eight barrels with separate chambers, with their accompanying parts. They are connected together so as to constitute a single steam-generating apparatus. All the parts at the left of the figure are in elevation. The next fourth of the drawings, to the right, is sectioned on the line $z\ z$ in Fig. 2. The third quarter of the drawings, toward the right, is sectioned on the line $y\ y$ in Fig. 2. The last portion to the right is sectioned on the line $x\ x$ in Fig. 2. Fig. 2 is a vertical section on the line $w\ w$ of Fig. 1. Fig. 3 is a horizontal section. Figs. 4, 5, 6, and 7 show what we esteem the most complete form of our invention. Fig. 4 is a longitudinal section through one of the castings, detached. Fig. 5 is an end view thereof. Fig. 6 is a section corresponding to Fig. 4, showing also the adjacent parts when the casting is properly fitted into its place in the front connection. Fig. 7 is a section on the line $s\ s$ in Fig. 6. Figs. 8 and 9 represent a modification. Fig. 8 is a vertical section, and Fig. 9 an elevation. This and the succeeding elevations are in the direction looking from the interior of the furnace. Figs. 10 and 11 represent another modification. Fig. 10 is a vertical section, showing the parts before the stays are riveted. Fig. 11 is an elevation. Figs. 12 and 13 show another modification. Fig. 12 is a vertical section, and Fig. 13 is an elevation. Figs. 14 and 15 show another modification. Fig. 14 is a vertical section, and Fig. 15 is an elevation. Figs. 16 and 17 show another modification. Fig. 16 is a vertical section, and Fig. 17 is an elevation.

Similar letters of reference indicate like parts in all the figures.

A is the barrel of the boiler; A', a tapering back end; $A^2$, a dome from which the dry steam is taken; B, a back connection through which the water descends from the barrel; C, inclined pipes through which the water travels forward and upward from the back connection, B, to the front connection, D, in which latter the water, mingled with steam which has been generated during its circuit, flows upward and passes into the barrel, where the steam disengages itself, and the water again travels around. The taper of the back end, A', provides liberal passages between a set of barrels laid side by side, through which the spent gases rise from the furnace after having properly circulated among the tubes and communicated their heat to the water. This feature, as also several others relating to other portions of the construction, is not claimed in this patent.

The present invention relates to the particular construction of the front and back connections, B D. The peculiarities are repeated at each end of each tube. A description of one will suffice for all. We will describe the parts adjacent to the front end of one of the tubes C.

The front connection, D, is bounded by two plates of stout boiler-iron. D' is the outermost, and D² the innermost, the distance apart being about two and a half inches.

Referring to Figs. 4, 5, 6, 7, holes are bored or otherwise produced in the sheets D' D² considerably larger than the tubes C. A malleable-iron casting is introduced, the outer portion of which will be marked M. The other parts will be designated by additional marks, as M' M², when necessary. Its face is smoothly finished, and makes a steam-tight joint with the corresponding face of a stout cover, N. The facility with which such facings can be made on the cast-iron, as compared with the production of such on the thin plate D' yields a great economy in the construction. A flange extends out a little and bears on the outer face of the plate D'.

O is a stout cross-bar, which, by the aid of a bolt, P, and cap-nut P', holds the cover N tightly into contact with the casting M. A tight and strong junction of the latter with the outer plate, D', is induced by fitting in the casting M with a tight fit and then expanding it by an expanding-tool.

M' M' are arms which reach across from the main part M of the casting, just described, and unite it to a ring, M², which fits tightly and is expanded within the plate D². These parts M' are thin and curved, being in fact portions of a hollow cylindrical extension of the casting M; but it is important that the hollow cylinder be not complete and tight. The liberal openings at the top and bottom provide not only for the engagement of the cross-bar O, but also for the very important and essential function of allowing the steam and water which pours out of the tube C to rise up through the connection D and flow to the barrel A. The tube C is joined tightly and strongly to the back ring, M², by expanding. The ring M, when fitted and expanded in the sheets D' and D², serves as a brace to stiffen and hold said sheets, and at the same time as a tie to connect them.

In the modification shown in Figs. 8 and 9 the hole in the inner plate, D², is smaller, only sufficient to receive the tube C. The latter is expanded directly into a tight and strong engagement with the plate D². The hole in the front plate, D', is about the same size as before described. The casting M is of pretty nearly the same form, and performs substantially the same functions as in the form first described; but the rim or flange outside is omitted. The cross-bar O bears on the inner or back edge of the casting M, which is extended inward a little beyond the inner face of the plate D'. The casting M is engaged with the plate D' by expanding, as before. The forms and functions of the cross-bar O, bolt P, cover N, and nut P' may be exactly as in the form first described. In this modification, and in those which succeed, the plates D' D² are held a proper distance apart and maintained stoutly in position by stays Q, which may be made in the ordinary manner, thimbles with square ends being cut of the proper length and being applied between the plates to serve as struts and resist a compressive force, while long rivets extend through them and through holes in the plates, and are headed at each end to serve as ties.

In the modification shown in Figs. 10 and 11 no casting is applied within either plate D' or D². The holes in each are made small. The cover N is made with a conical face, and is made to match a finished conical surface prepared around the hole. The cross-bar O is greatly widened. It bears directly on the inner face of the plate D'.

In the modification shown in Figs. 12 and 13 a casting, M, is introduced and expanded within a suitable hole in the plate D'. The hole is flared inward, and the casting is correspondingly expanded. In other respects this modification may be as in Figs. 8 and 9.

In the modification shown in Figs. 14 and 15 the casting M is extended outward considerably. It is engaged with the outer plate, D', by expanding, and receives the cover N on a finished face, as in most of the other examples; but the cover N is confined by different means. A peculiarly-formed screw, X, is engaged with the cover after being tapped through a peculiarly-formed holding-strap, which applies on the exterior, and engages under a flange, M³, which is formed on the casting sufficiently in front of the plate D' to allow strong internal hooks on the strap to engage therewith.

In the modification shown in Figs. 16 and 17 no casting is employed around the hole in either plate. This is like the modification shown in Figs. 10 and 11, except that neither the cover N nor the seat therefor is beveled. A groove is turned or otherwise produced concentric to the hole and coincident with the outer edge of the cover N. The surface of the metal between this groove and the hole is slightly raised and truly finished. The cover N, being properly faced, fits steam-tight thereto.

In all the forms the plates D' D² may be of boiler iron or steel, extending in one continuous sheet from the top to the bottom of the respective front connection, D, or back connection, B. The junctions of the connections to the barrel A and to the water-legs E at the sides may be formed in any ordinary or suitable manner. We prefer short thimbles expanded into the holes, as represented in Fig. 3.

We attach much importance not only to the making of the front and back connections of parallel continuous sheets D' D², but also to the manufacture of such complete in themselves independent of the body of the boiler, and afterward attaching the connections to the body or barrel by thimbles or analogous fastenings, as shown.

Further modifications may be made.

Parts of the invention may be used without the whole.

In all the forms the sheets D' D² may be in two or more pieces, riveted, brazed, or welded. In all the forms our invention allows the strength and lightness due to the continuity of the parts, and affords unusually liberal space for the free movement of the steam and water.

In the form shown in Figs. 4 to 7 the staying by the parts M' between the front ring, M, and the rear ring, M², produces a very rigid union and secures great strength without much obstructing the water-way. Additional stays may be employed with this form of the invention, if preferred in any case.

The form shown in Figs. 8 and 9 we esteem for some reasons preferable to any of the others.

We claim as our invention—

1. In a steam-boiler having tubes C extending through the furnace, with front and back connections therefor, the construction of such connection in two sheets, D' D², strongly stayed across, said connections being formed independently of the barrel and united thereto by thimbles, substantially as herein specified.

2. In a steam-boiler having tubes C and connections therefor, made in separate sheets D' D², the malleable cast ring M, expanded in and adapted to form an easily-finished face for steam-tight contact with the cover N, as herein specified.

3. In combination with the plates D' D² and tubes C, the malleable casting M M' M², expanded into both the sheets, and strongly bracing across the space, adapted to serve substantially as and for the purposes herein specified.

In testimony whereof we have hereunto set our hands at New York city, New York.

GEO. H. BABCOCK.
S. WILCOX.
NAT. W. PRATT.
E. H. BENNETT.

Witnesses:
CHARLES A. KNIGHT,
CHARLES C. STETSON.